Figure 1:
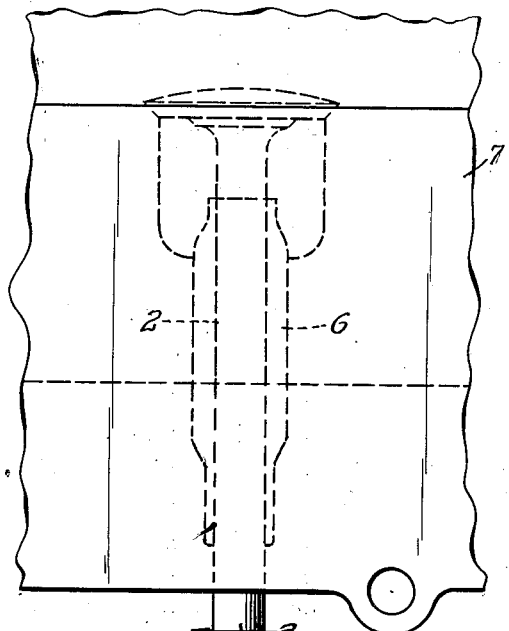

June 23, 1953  J. F. SUMA  2,642,673
HYDRAULIC VALVE GAUGE
Filed April 11, 1951

Inventor:
James F. Suma
By: Soans, Slaister + Anderson
attys.

Patented June 23, 1953

2,642,673

UNITED STATES PATENT OFFICE 2,642,673

HYDRAULIC VALVE GAUGE

James F. Suma, Chicago, Ill.

Application April 11, 1951, Serial No. 220,395

3 Claims. (Cl. 33—181)

This invention relates to an improvement in a gauge for facilitating correct adjustment or setting of valves in internal combustion engines. The gauge is a tool for indicating the extent of variance from a predetermined normal standard, of the distance between a valve stem and its actuating cam lobe.

The objects of the invention are to provide a rugged and simple gauge which may be successfully used by the average automobile engine mechanic, and which will be strong and durable so as to be capable of withstanding rough handling, such as is frequently accorded to tools employed about an internal combustion engine during repair or reconditioning thereof; to provide a gauge of the character indicated which will be easily readable and which will clearly indicate the nature of correction if any is required; to provide such a gauge which may be used on engines of various makes wherein the standard or normal distances between the valve stem and its actuating cam lobe differ substantially; and in general, it is the object of this invention to provide an improved gauge of the character indicated.

Other objects and advantages of this invention will be understood by reference to the following specification and accompanying drawing wherein there is illustrated a valve setting gauge embodying a selected form of the invention.

Figure 2:
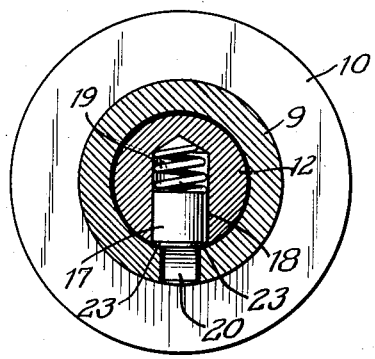
Figure 3:
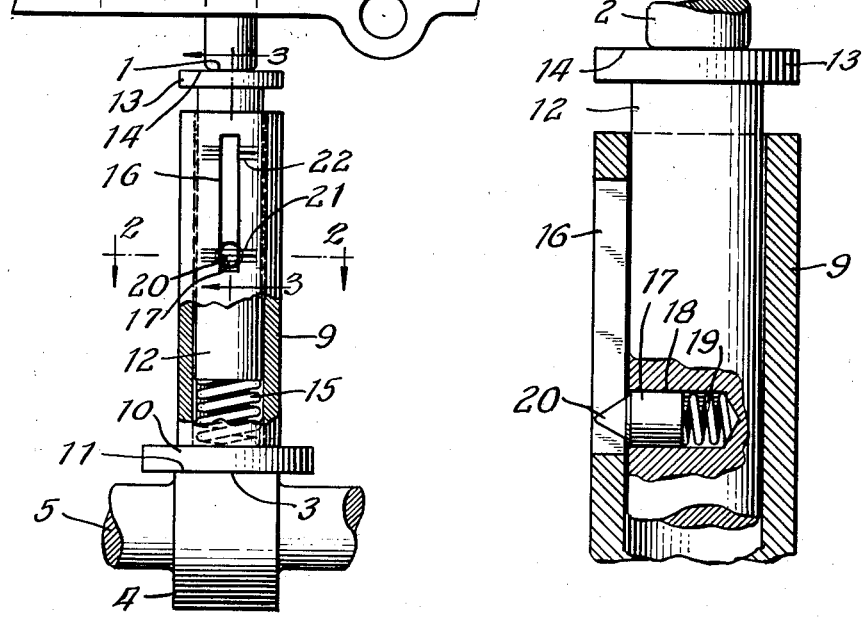

In the drawings;

Fig. 1 is an elevational view illustrating the manner in which the improved gauge is used and illustrating certain details of the gauge structure;

Figs. 2 and 3 are respectively, sections on the lines 2—2 and 3—3 of Fig. 1.

The gauge structure herein referred to is designed for indicating what correction, if any, is required to locate the end 1 of a valve stem 2 at the proper distance from the heel 3 of the actuating cam 4 for that particular valve. The cam 4 represents one of a series of similar cams on a cam shaft 5 of any internal combustion engine, and the valve stem 2 represents the stem of any of the exhaust or intake valves of an ordinary internal combustion engine, the valve stem 2 being herein shown as being guided in a bushing 6 seated in the engine block 7. The valve spring which normally effects seating of the valve is usually (but not necessarily) removed during the use of the gauge and such spring is therefore not shown.

The space between the end 1 of the valve stem and the heel 3 of the cam 4 normally receives a hydraulic valve lifting device which is initially manufactured to operate most efficiently when the distance between the cam heel 3 and the end of the valve stem 1 is a predetermined distance within a small tolerance. If this distance is too small the valve will not satisfactorily close or seat, and if the distance is too great the valve will not open its full extent and noisy operation will be caused. Hydraulic valve lifters now used on several L-head type engines are non-adjustable and this makes it all the more important that the distance between the valve stem and cam be made to correctly receive the lifter.

The gauge structure herein shown comprises a tubular body or housing 9 which has one end open and its other end provided with an end closure wall 10 which is provided with a true flat outer face 11 for seating on the cam 4. A plunger 12 is slidably fitted in said tubular housing and is provided at its outer or upper end with an end flange or head 13 which has a true flat outer face 14 for engaging the end 1 of the valve stem. A suitable spring 15 is interposed between the inner end of the plunger 12 and the end wall 10 of the housing to resiliently urge the plunger outwardly from the housing 9.

The side wall of the tubular housing 9 is provided with a slot 16 elongated in the direction of the length of the housing and in parallel relation to the axis of the housing, and the plunger 12 is provided with an indicator pin 17 which is slidably fitted in a recess or socket 18 which extends diametrically of the plunger 12 but not quite through the stem as shown in Fig. 3.

A spring 19 is interposed between the bottom of the socket 18 and the adjacent or inner end of the plunger 17 so as to normally urge said indicator pin 17 to move outwardly of the plunger 12. The indicator pin 17 and the socket 18 may conveniently be of cylindrical cross section and the pin 17 is provided with a wedge shaped or chisel pointed projecting end portion 20, the edge of which extends transversely of the length of the gauge for registration with indicator markings 21 or scale graduations 21 or 22 provided on the outside of the tubular housing adjacent the sides of the slot 16 near its opposite ends.

In this instance, two sets of graduations 21 and 22 are shown, one set being so located as to cooperate with the indicator 17 when the gauge is used in connection with one make of engine and the other set of graduations 22 being so located as to cooperate with said indicator 17 when the gauge is used with a different make of engine. Other sets of graduations may, of course, be provided and the slot 16 may be lengthened, if desired, to accommodate other sets of graduations in other required positions.

The pointer portion 20 of the indicator 17 is of reduced width relative to the diameter of the base portion of the indicator so that shoulders 23 are formed on the indicator for engagement with portions of the housing 9 adjacent the opposite sides of the slot 16 as shown in Fig. 2. This prevents the indicator pin 17 from being lost from the gauge.

By providing the socket 18 of sufficient depth to permit the indicator to be pressed back into the socket against the pressure of the spring 19, it is possible to assemble the plunger 12 and housing 9 by initially holding the indicator 17 in fully depressed position to permit its outer or pointer end 20 to pass by the upper portion of the housing wall until the pin can enter the slot 16. In some instances, instead of a pointed indicator end portion, said end portion may be provided with a flat end face and a gauge mark scribed across such end face for registration with the gauge marks 21 or 22. In either event, the indicator pin is prevented from rotating so as to maintain its indicating end of mark in the proper alignment with the direction of the indicator marks 21 by providing the projecting end portion 20 of the pin with flat sides for engagement with the sides of the slot 16, said indicator portion 20 being made of a width to slidably fit in said slot.

In free condition the gauge will be expanded to its full length by reason of the expansive force of the spring 15 tending to urge the plunger 12 from the housing 9. Such expansion will, of course, be limited by engagement of the indicator pin portion 20 with the upper or outer end of the slot 16. When the gauge is employed for its indicated purpose, it is grasped about its housing 9 and the end 14 of the plunger 12 is engaged with the end of the valve stem whereupon the housing or body 9 is moved upwardly and rocked inwardly until its end wall 11 can be seated on the cam 4. The spring 15 is then permitted to expand the gauge to a snug fit between the valve stem end 1 and the cam 4 whereupon the position of the indicator portion 20 with reference to the gauge marks 21 or 22 is noted.

Inasmuch as the variance which occurs in the indicated dimension is not normally very great, only a few scale marks are required for each engine, i. e., sufficient to indicate a variation of, say, .020 inch from a predetermined setting which will be indicated by a central gauge mark. Any error in the correctness of the distance between the valve stem end 1 and the cam 4 will be indicated by an offset relation between the end of the indicator portion 20 and such central or normal gauge mark. The scale marks on either side of such normal mark may be so positioned as to indicate the extent of correction required in one hundredths of an inch and an experienced mechanic can accurately judge whether the change required is in one thousandths of an inch.

It is not considered practicable to provide the graduations 21 or 22 in one thousandths of an inch inasmuch as such fine graduations would normally require the employment of a magnifying glass for reading and in any event, would be very difficult to apply in a form which would be durable enough for the purposes of a tool of the kind herein contemplated. However, graduations in one hundredths of an inch are practicable and afford a satisfactory indication of the spacing of the valve stem end from the cam.

Various changes in the described structure may be made while retaining the principles thereof.

I claim:

1. A gauge for checking the distance between a cam lobe and a valve stem in an internal combustion engine, comprising an elongated tubular housing having a uniform bore therein, said housing being fully open at one end and having an end wall at its other end, an elongated plunger slidably seated in said housing and projecting from the open end thereof, a spring means in said housing intermediate said end wall and the adjacent end of said plunger for yieldably urging said plunger outwardly of said housing, said gauge being insertable between a cam lobe and valve stem with said plunger moved inwardly of said housing against the pressure of said spring, the latter serving to urge expansion of the over-all length of the gauge into a snug fit between the cam lobe and valve stem, said housing being provided intermediate its ends with an elongated slot and said plunger having an indicator projecting laterally therefrom into said slot and movable lengthwise in said slot as an incident to the movement of said plunger in said housing, said indicator serving to prevent the withdrawal of said plunger from said housing, and a scale on the surface of said housing adjacent said slot for cooperation with said indicator to indicate the extent of variance of the distance between said cam lobe and valve stem from a predetermined distance.

2. A gauge for checking the distance between a cam lobe and a valve stem in an internal combustion engine, comprising an elongated tubular housing having a uniform bore therein, said housing being fully open at one end and having an end wall at its other end, an elongated plunger slidably seated in said housing and projecting from the open end thereof, a spring means in said housing intermediate said end wall and the adjacent end of said plunger for yieldably urging said plunger outwardly of said housing, said gauge being insertable between a cam lobe and valve stem with said plunger moved inwardly of said housing against the pressure of said spring, the latter serving to urge expansion of the overall length of the gauge into a snug fit between the cam lobe and valve stem, said housing being provided intermediate its ends with an elongated slot and said plunger having an indicator projecting laterally therefrom into said slot and movable lengthwise in said slot as an incident to the movement of said plunger in said housing, said indicator having a base portion removably seated in a recess in the plunger, means for retaining said base portion within said recess with part of said indicator extending outwardly from the recess and into said slot, said indicator serving to prevent the withdrawal of said plunger from said housing when said indicator projects into said slot, and a scale on the surface of said housing adjacent said slot for cooperation with said indicator to indicate the extent of variance of the distance between said cam lobe and valve stem from a predetermined distance.

3. A gauge for checking the distance between a cam lobe and a valve stem in an internal combustion engine, comprising an elongated tubular housing open at one end and having an end wall at its other end, an elongated plunger slidably fitted in said housing and projecting therefrom, a spring means in said housing intermediate said end wall and the adjacent end of said plunger for yieldably urging said plunger outwardly of said housing, said gauge being insertable between a cam lobe and valve stem with said plunger moved inwardly of said housing against the pressure of said spring, the latter serving to urge expansion of the over-all length of the gauge into a snug fit between the cam lobe and valve stem, said housing being provided intermediate its ends with an elongated slot and said plunger having an indicator projecting laterally therefrom into said slot and movable lengthwise in said slot as an incident to the movement of said plunger in said housing, a scale on the surface of said housing adjacent said slot for cooperation with said indicator to indicate the extent of variance of the distance between said cam lobe and valve stem from a predetermined distance, said indicator having a base portion slidably seated in a recess in the plunger, a spring interposed between the bottom of said recess and the adjacent end of the indicator for urging the indicator to move outwardly from the recess, the base portion having transversely of said slot a dimension which is greater than the width of said slot and being provided with shoulders engaging the inside of said housing adjacent the opposite sides of said slot so as to be thereby retained in the plunger against the tendency of said spring to displace the indicator from said plunger, said indicator serving to prevent withdrawal of said plunger from said housing and said recess being deep enough to permit said indicator to be pressed into the plunger to initially permit assembly of the plunger and housing substantially as described.

JAMES F. SUMA.

References Cited in the file of this patent

UNITED STATES PATENTS

| Number | Name | Date |
|---|---|---|
| 1,633,110 | Koons | June 21, 1927 |
| 1,654,319 | Brown | Dec. 27, 1927 |
| 1,866,000 | Alonzo | July 5, 1932 |
| 2,471,106 | Hall | May 24, 1949 |
| 2,474,294 | Weeks | June 28, 1949 |